(12) United States Patent
Hong

(10) Patent No.: US 6,836,079 B2
(45) Date of Patent: Dec. 28, 2004

(54) LIGHT EMITTING LAMP

(76) Inventor: Sam-Pyo Hong, 502 BYC Bldg., 648-1 Yeok-sam 1-dong Kangnam-ku, Seoul (KR)

( * ) Notice: Subject to any disclaimer, the term of this patent is extended or adjusted under 35 U.S.C. 154(b) by 146 days.

(21) Appl. No.: 10/239,924

(22) PCT Filed: Mar. 31, 2001

(86) PCT No.: PCT/KR01/00519
§ 371 (c)(1),
(2), (4) Date: Feb. 3, 2003

(87) PCT Pub. No.: WO01/73818
PCT Pub. Date: Oct. 4, 2001

(65) Prior Publication Data
US 2004/0066652 A1 Apr. 8, 2004

(30) Foreign Application Priority Data
Mar. 31, 2000 (KR) .................................... 2000-016914

(51) Int. Cl.[7] .............................................. H05B 37/00
(52) U.S. Cl. ...................................... 315/291; 315/363
(58) Field of Search ........................... 315/76, 291, 363

(56) References Cited

U.S. PATENT DOCUMENTS

| | | | |
|---|---|---|---|
| 4,870,325 A | * | 9/1989 | Kazar .......................... 315/178 |
| 4,992,704 A | | 2/1991 | Stinson |
| 5,896,010 A | * | 4/1999 | Mikolajczak et al. ......... 315/77 |
| 6,498,440 B2 | * | 12/2002 | Stam et al. ................. 315/291 |

FOREIGN PATENT DOCUMENTS

| JP | 06-232456 | 8/1994 |
|---|---|---|
| KR | 1999-000882 | 1/1999 |
| KR | 2000-0005355 | 3/2000 |

* cited by examiner

*Primary Examiner*—David Vu
(74) *Attorney, Agent, or Firm*—Burns, Doane, Swecker & Mathis, L.L.P.

(57) ABSTRACT

The present invention relates to a light emitting lamp for controlling various brightness and color more efficiently. The light emitting lamp having plural red color emitting device, green color emitting device, and blue color emitting device; comprises an input means for inputting the control request signal of brightness and color by a user, a brightness control means for generating a digital control signal modulated in amplitude wherein the digital control signal has a plurality of signal levels in accordance with the request signal of brightness, a color control means for generating a digital control signal modulated in pulse-width wherein the digital control signal has a plurality of signal level in accordance with the request signal of color, wherein the brightness and color of plurality of the emitting device are controlled by the digital control signal modulated in amplitude and pulse-width.

12 Claims, 4 Drawing Sheets

LIGHT EMITTING LAMP

TECHNICAL FIELD

The present invention relates to a light emitting lamp, and more particularly to the light emitting lamp for controlling the brightness and the color of the light emitting lamp effectively.

BACKGROUND ART

Generally, a light lamp radiates light by emission of heat and by discharge of gas.

The former example may be an incandescent lamp. The incandescent lamp calorifies a tungsten filament formed within a glass bulb having a vacuum or a certain gas and radiates in accordance with calorific light generated by calorifying the tungsten filament.

The latter example may be a neon lamp, an arc lamp, a discharge lamp and a fluorescent lamp. The latter lamps are charged with various gases in the glass bulb and radiate light by discharging gas.

As it described above, electric power of the conventional light lamp is set up predetermined value for example 5 W, 10 W, 30 W, 5 W or 100 W when the conventional light lamp is manufuctured.

Also, the incandescent lamp radiates one color light because the incandescent lamp radiates by calorifying the tungsten filament. Consequently a calorific light by calorifying the tungsten filament is one color.

Also, the neon lamp, the arc lamp, the discharge lamp and the fluorescent lamp radiate a certain color based on the discharge gas.

Therefore, because the conventional lamps radiate one color light by calorifying the filament or the discharging gas charged, user might not be satisfied the conventional lamps who wants a variation of color using the conventional lamp respectively.

Also, the brightness of the conventional lamps cannot be changed because the brightness of the conventional lamps was set up when the conventional lamps are manufuctured.

Also, the disadvantage of the conventional lamps is that the user should change the lamp for changing the brightness of the lamp which has a different electric power.

So, the present invention is intended to overcome the above described disadvantages, it is an object of the present invention to provided a light emitting lamp having red emitting elements, green emitting elements and blue elements.

It is another object of the present invention to provide a light emitting lamp which can be controlled brightness by amplitude modulation of emitting elements.

It is still another object of the present invention to provide a light emitting lamp which can be controlled color by pulse-width modulation of emitting elements.

It is still another object of the present invention to provide a light emitting lamp which beforehand stores a control value of the brightness and the color which can automatically controlled a lighting state by the control value of the brightness and the color are stored.

For the accomplishing the object of the present invention, in accordance with an embodiment of the present invention, there is provide a light emitting lamp having a plurality of emitting elements, including red color emitting elements, green color emitting elements and blue color emitting elements, comprising, an input means for inputting a control request signal of brightness and color by a user, a brightness control means for generating an amplitude modulated digital regulation signal having a plurality of signal levels according to the control request signal of brightness and a color control means for generating a pulse-width modulated digital regulation signal having a plurality of signal levels according to the control request signal of color, wherein, the brightness of the plurality of emitting elements are controlled by the amplitude modulated digital regulation signal and the color of the plurality of the emitting elements is controlled by the pulse-width modulated digital regulation signal.

The brightness control means further comprises an AC/DC converter for converting an AC power source to a DC power source, a controller for generating a control signal of brightness in accordance with the control request signal of brightness after receiving the DC power source from the AC/DC converter, a D/A converter for generating a current having a plurality of signal levels by subdividing a reference voltage in accordance with the control signal of brightness, an amplitude modulation generator for generating the digital regulation signal of the brightness having a plurality of signal levels by modulating the current's amplitude, an electric power amplifier for amplifying the digital regulation of the brightness generated from the amplitude modulation generator and then for generating the digital regulation signal of brightness amplified for the plurality of emitting elements, wherein the D/A converter generates the current having $2^n$ signal levels according to structured bits of the D/A converter.

The color control means further comprises an AC/DC converter for converting an AC power source to a DC power source, a controller for generating a control signal of color in accordance with the digital control request signal of color after receiving the DC power source from the AC/DC converter, a D/A converter for generating a current having a plurality of signal levels by subdividing a reference voltage in accordance with the control signal of color, a pulse-width modulation generator for generating the digital regulation signal of color having a plurality of signal levels by modulating the current's pulse-width, an electric power amplifier for amplifying the digital regulation signal of color generated from the pulse-width modulation generator and then for generating the digital regulation signal of color amplified for the plurality of emitting elements, wherein the controller controls the red emitting elements, the green emitting elements and the blue emitting elements individually, the D/A converter generates the current having $2^n$ signal levels according to structured bits of the D/A converter.

Another preferred of the present invention provides a light emitting lamp having an electrode, a spiral electrode and a substrate formative implement, comprising, a brightness control means and a color control means for controlling the brightness and the color of the light emitting lamp installed inside of the substrate formative implement, an emitting means having a plurality of emitting elements controlled by the brightness control means and the color control means through a plurality of levels, a RF receiving means installed on an inside region formed the plurality of emitting elements or an outer region formed the plurality of emitting elements, a glove cap coupled to the substrate formative implement removably which encloses the emitting means and the RF receiving means.

Figure 1:
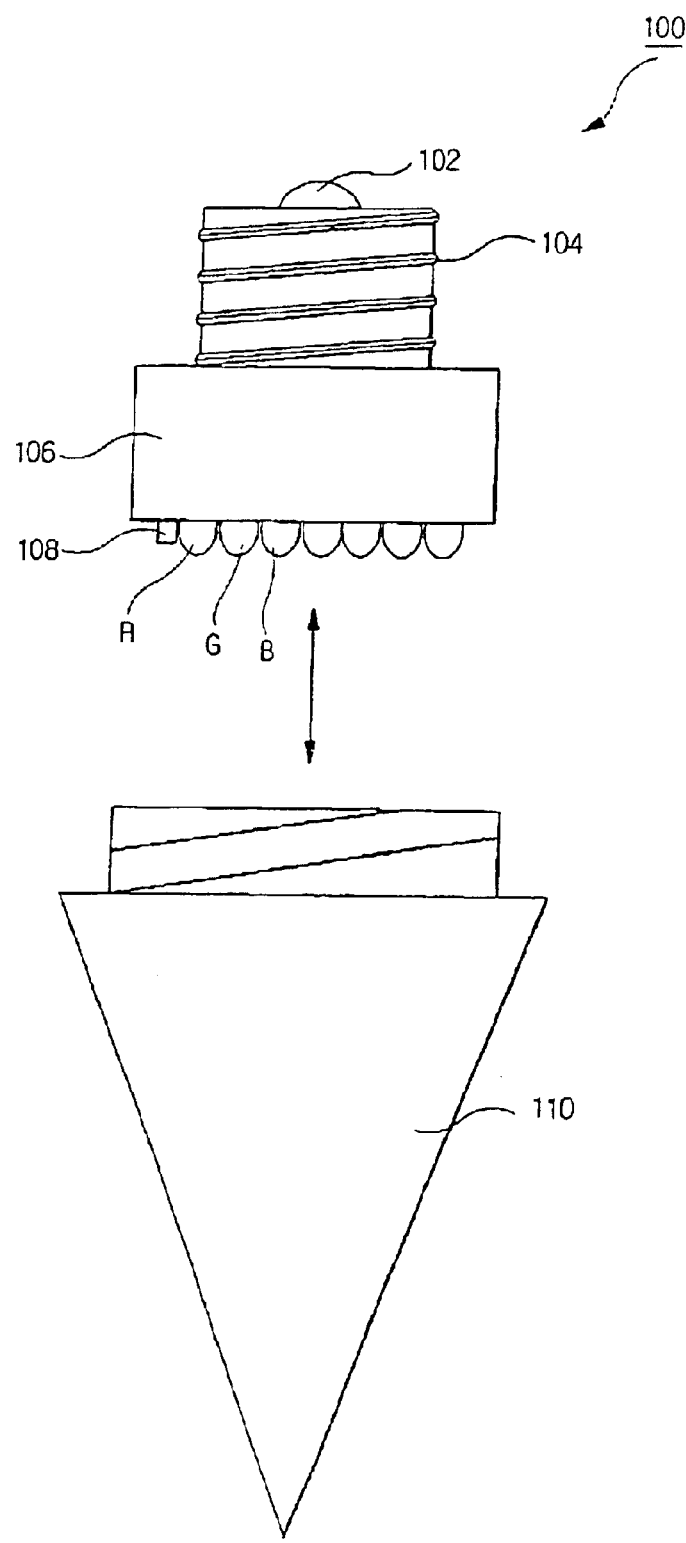
FIG. 1 is a schematic diagram for showing a light emitting lamp of the present invention.

<The description of the reference characters of the major parts of the drawings>

100: light emitting lamp
102: electrode
104: spiral electrode
106: control unit
108: RF signal receiver
110: glove cap
300: AC/DC converter
302: emitting means
306: switch unit
308: controller
310: D/A converter
312: amplitude modulation generator
314: pulse-width modulation generator
316: electric power amplifier
318: memory Embodiments Hereinafter, a light emitting lamp of the present invention will be described with accompanying drawings, but it should be understood that the present invention might not be restricted and limited by the following embodiments.

Figure 2:
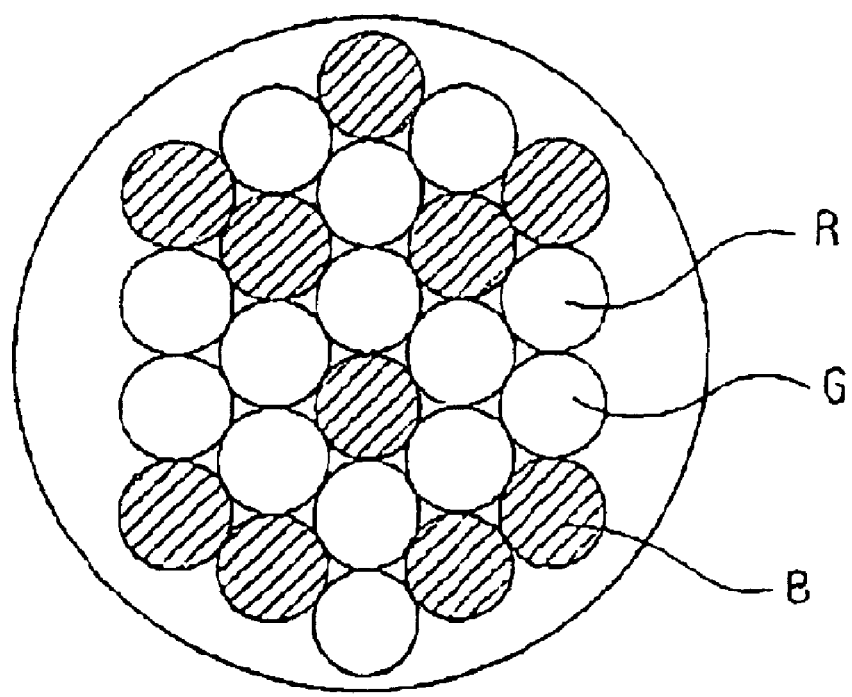
FIG. 2 is a detailed diagram for showing an emitting means in FIG. 1.
Figure 3:
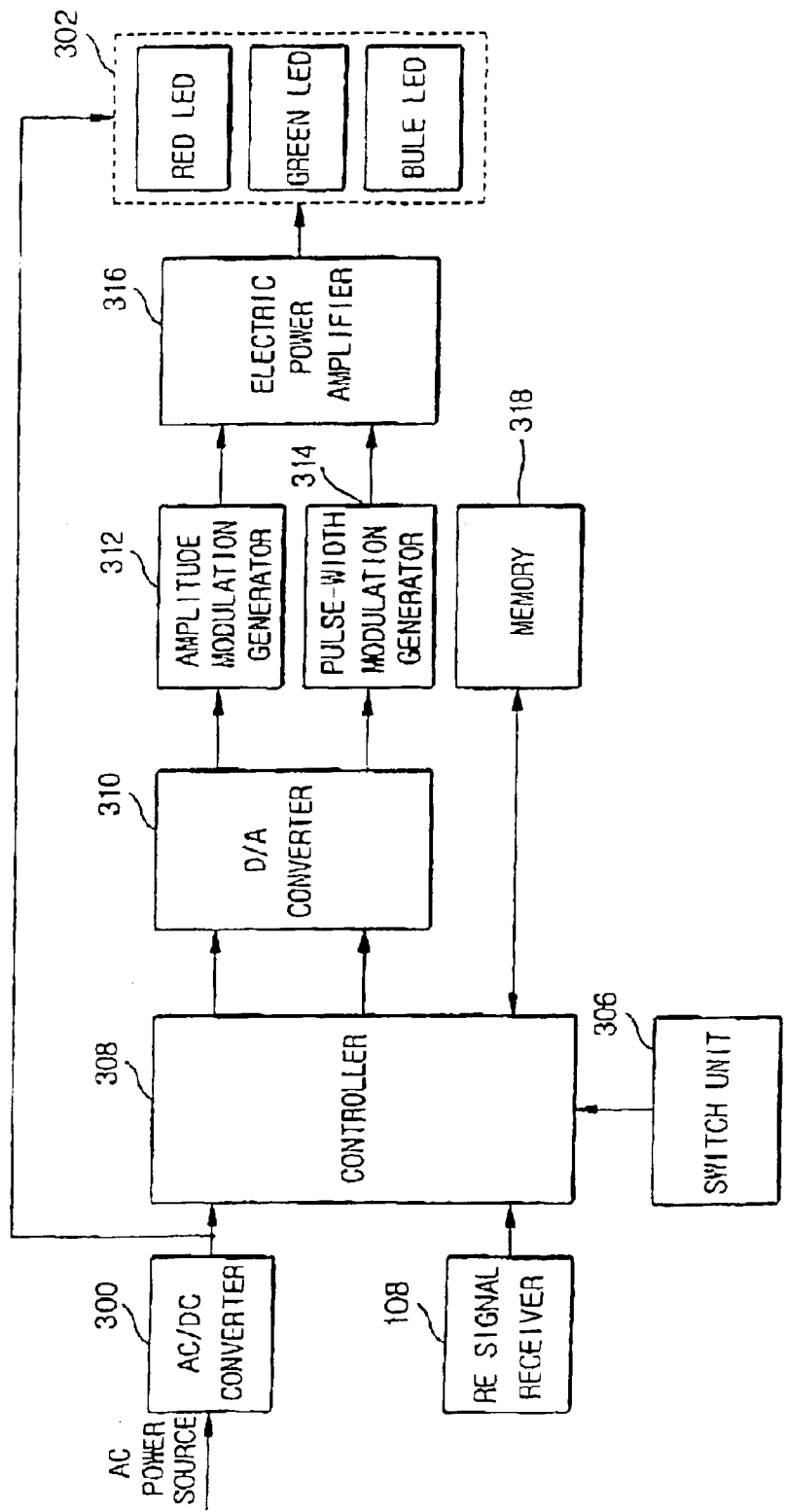
FIG. 3 is a block diagram for showing a controller in FIG. 1.
Figure 4A:
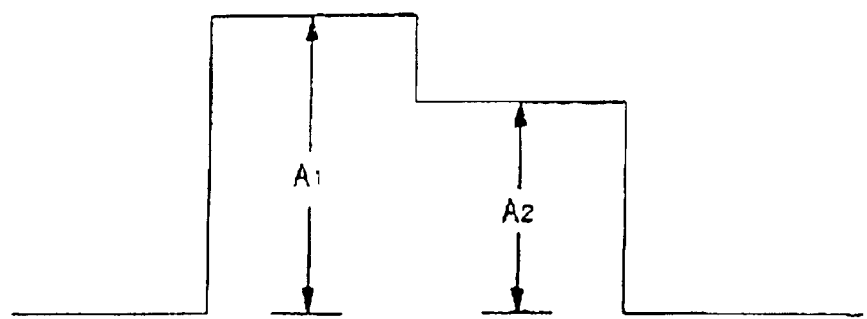
FIG. 4a is a drawing for showing a signal is amplitude modulated.
Figure 4B:
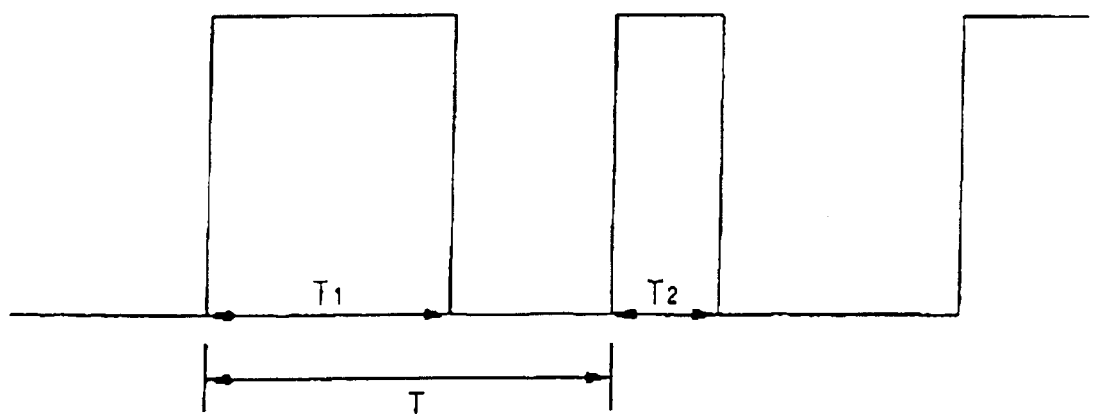
FIG. 4b is a drawing for showing a signal is pulse-width modulated.

FIG. 1 is a schematic diagram for showing a light emitting lamp of the present invention, FIG. 2 is a detailed diagram for showing an emitting means in FIG. 1, FIG. 3 is a block diagram for showing a controller in FIG. 1. FIG. 4a is a drawing for showing an amplitude-modulated signal, FIG. 4b is a drawing for showing a pulse-width modulated signal.

Referring to the FIG. 1, a light emitting lamp 100 of the present invention comprises a projecting electrode 102, a spiral electrode 104, a control means 106, a emitting means R,G,B, a RF signal receiver 108 and a glove cap 110.

The spiral electrode 104 is formed itself into spiral for coupling up to a socket (not illustrated) of the light emitting lamp located above the light emitting lamp 100. The projecting electrode 102 is formed on a central region of the spiral electrode 104 for connecting with the socket of the light emitting lamp.

Also, the control means 106 is installed under the spiral electrode 104, the bottom face of the control means 106 is connected with the emitting means R,G,B electrically. The emitting means R,G,B comprises a plurality of LED(Light Emitting Device) elements.

Referring to FIG. 2, the emitting means R,G,B comprises a plurality of emitting elements which radiates a light of red color, green color and blue color when a power source is supplied to the emitting means R,G,B.

At this time, the emitting means R,G,B has an arrangement structure of the red emitting elements, the green emitting elements and the blue emitting elements for getting a result based on the following mathematical formula 1.

brightness signal=green(59%)+blue(30%)+red(11%)  [MATHENATICAL FORMULA 1]

The description of the arrangement structure of the red emitting elements, the green emitting elements and the blue emitting elements in accordance with the mathematical formula 1 can be omitted because it is to be understood by one skilled in the art invention.

At this time, the RF signal receiver 108 is installed on a central region or the outer region formed the emitting means R,G,B which comprises the plurality of emitting elements. Also, the RF signal receiver 108 can receive a RF signal when the glove cap 110 is coupled.

The glove cap 110 is coupled removably by a screw means formed on the inside face of the control means 106. While the glove cap 110 is explained such as a trigonal pyramid, the glove cap can be changed optionally from the trigonal pyramid to a various shape such as a cylinder, a multilateral pyramid or a sphere.

As described above, the control means 106 having an outward construction of the present invention will be described with accompanying FIG. 3.

Referring to FIG. 3, the control means 106 comprises an AC/DC converter 300, an emitting means 302, a RF signal receiver 108, a switch unit 306, a controller 308, a digital/analog converter 310(hereinafter, the digital/analog converter called D/A converter), an amplitude modulation generator 312, a pulse-width modulation generator 314, an electric power amplifier 316 and a memory 318.

The RE signal receiver 108 has an equal reference character with the RF signal receiver in the FIG. 1 because the RF signal receiver has equal construction with the FIG. 1.

The AC/DC converter 300 converts an AC power source received from the outside to a DC power source and then outputs the DC power source to the controller 308 and the emitting means 302.

The RF signal receiver 108 generates a control request signal of brightness and color received from a user using a remote controller who located in a remote place to the controller 308. At this time, the control request signal of brightness and color can be infrared rays.

The switch unit 306 comprises a keypad having a plurality of keys which generates the control request signal of brightness and color for controlling the brightness and color of the emitting means 302 For example, the switch unit 306 can be comprised an increment key and a reduction key of the brightness, an increment key and a reduction key of the color and a memory key.

The increment key and the reduction key of the brightness generate a key signal for increasing and reducing of the brightness of the emitting means 302. And the increment key and the reduction key of the color generate a key signal for increasing and reducing of the color of the emitting means 302. Also, the memory key for storing the control request signal of brightness and color be set up by the increment key and the reduction key of the brightness, the increment key and the reduction key of the color, the memory key can be pluralized for storing a plurality of control signals.

Also, the switch unit 306 comprises a power supply key for supplying and excluding the power source to the emitting means 302.

The controller 308 generates a control signal of brightness and color in accordance with the request signal of brightness and color inputted from the RF signal receiver 108 or the switch unit 306.

The D/A converter 310 generates a current having a plurality of signal levels in accordance with the control signal of brightness and color inputted from the controller 308. The D/A converter 310 can be composed of 4 bits, 6 bits, 8 bits, 12 bits or 16 bits.

Also, the D/A converter 310 is unitized with the controller 308 or separately from the controller 308.

The amplitude modulation generator 312 generates a regulation signal of brightness by modulating amplitude of the control signal of brightness having a plurality of signal levels and then outputs the regulation signal of brightness to the electric power amplifier 316.

The pulse-width modulation generator 314 generates a regulation signal of color by modulating pulse-width of the control signal of color having a plurality of signal levels and then outputs the regulation signal of color to the electric power amplifier 316.

The electric power amplifier 316 amplifies the regulation signal of brightness inputted from the amplitude modulation generator 312 and the regulation signal of color inputted from the pulse-width modulation generator 314 and then outputs the regulation signal of brightness amplified and the regulation signal of color amplified to the emitting means 302.

The brightness and color of the emitting means 302 are controlled in accordance with the regulation signal of brightness and color inputted from the electric power amplifier 316. At this Lime, the emitting means 302 comprises red-LEDs, green-LEDs and blue-LEDs.

The memory 318 stores a key signal of brightness and color being set up by the user using the memory key of the switch unit 306 and then outputs the key signal stored according to the operation of the memory key of the switch unit 306.

Also, the memory 318 stores the key signal of brightness and color set up by user using the memory key of the switch unit 306 who located in a remote place.

Hereinafter, the process of the light emitting lamp according to the present invention will described.

The AC/DC converter 300 converts an AC power source inputted from the outside to a DC power source and then outputs the DC power source to the controller 308. Also, the AC/DC converter 300 outputs the DC power source to the emitting means 302.

The controller 308 operated by the DC power source is received the control request signal of brightness and color from the RF signal receiver 108 or the switch unit 306.

Then, the controller 308 generates the control signal of brightness and color in accordance with the control request signal of brightness and color to the D/A converter 310.

Namely, when the control request signal of brightness or color is inputted from the RF signal receiver 108 or the switch unit 306, the controller 308 generates the control signal of brightness or color to the D/A converter 310 in accordance with the control request signal of brightness or the control request signal of color.

The D/A converter 310 generates a current having a plurality of signal levels by subdividing a reference voltage in accordance with the control signal of brightness or the control signal of color to the amplitude modulation generator 312 or the pulse-width modulation generator 314.

At this time, the D/A converter 310 Generates the current having a plurality of signal levels by subdividing the reference voltage in accordance with the structured bit of the D/A converter 310.

Namely, when the structured bit of the D/A converter is n bit, the D/A converter 310 generates the current having $2^n$ signal levels by subdividing the reference voltage into $2^n$ levels in accordance with the control signal of brightness inputted from the controller 308 to the amplitude modulation generator 312.

For example, when the structured bit of the D/A converter is 4 bits, the D/A converter 310 generates the current having $2^4$ signal levels by subdividing the reference voltage into $2^4$ levels in accordance with the control signal of brightness to the amplitude modulation generator 312. Hence, the emitting means 302 executes a variation of brightness having 16 signal levels in accordance with the current having 16 levels.

On the other hand, when the structured bit of the D/A converter 310 is n bit, the D/A converter 310 generates the current having $2^n$ signal levels by subdividing the reference voltage into $2^n$ levels in accordance with the control signal of color inputted from the controller 308 to the pulse-width modulation generator 314.

At this time, the controller 308 generates each the control signal of color for controlling separately the red emitting elements, the green emitting elements and the blue emitting elements to the D/A converter 312.

Therefore, the D/A converter 310 subdivides the reference voltage of the red emitting elements, the Green emitting elements and the blue emitting elements and then generates the current having a plurality of signal levels to the pulse-width modulation generator 314 by subdividing the reference voltage into lots.

For example, when the controller 308 generates the control signal of color for controlling the red emitting elements of the emitting means 302, the D/A converter 310 being structured 4 bits generates the current having 16 signal levels for controlling the red emitting elements to the pulse-width modulation generator 314.

Also, the D/A converter 310 being structured 4 bits generates the current having 16 signal levels for controlling the green emitting elements of the emitting means 302 to the pulse-width modulation generator 314.

Also, the D/A converter 310 being structured 4 bits generates the current having 16 signal levels for controlling the blue emitting elements of the emitting means 302 to the pulse-width modulation generator 314. Therefore, the emitting means 302 can be executed controlled the color control of the emitting means 302 through a total 4192 levels in accordance with the current having 16 signal levels for controlling red emitting elements, the current having 16 signal levels for controlling the green emitting elements and the current having 16 signal levels for controlling the blue emitting elements.

The present invention executes more accurately control of brightness and color because the control signal of brightness and color having the plurality of signal levels are controlled by digital processing based on the structured bit of the D/A convener 310.

The amplitude modulation generator 312 generates an amplitude modulation signal such as FIG. 4a by modulating amplitude of the current having the plurality of signal levels for controlling brightness inputted from the D/A converter 310.

Referring to FIG. 4a, the amplitude of the current having the plurality of signal levels inputted from the D/A converter 310 is an A1, A2 by modulating amplitude.

At this time, the more the amplitude is higher such as A1, the more the brightness of the emitting means 302 is stronger because the power source having a high level is supplied to the emitting means 302. The more the amplitude is lower such as A2, the more the brightness of the emitting means 302 is weaker because the power source having a low level is supplied to the emitting means 302.

The electric power amplifier 316 amplifies the amplitude modulation signal generated from the amplitude modulation generator 312 and then outputs the amplitude modulation signal amplified. The brightness of the emitting means 302 is controlled in accordance with the amplitude modulation signal amplified.

Also, the pulse-width modulation generator 314 generates the pulse-width modulation signal such as FIG. 4b by modulating the pulse-width of the current having the plurality of signal levels inputted from the D/A convener 310.

Referring to FIG. 4b, the period of the control signal of the emitting means 302 for controlling the red emitting elements, the green emitting elements and the blue emitting is T, the control signal comprises a pulse-width modulation signal having a such as T1 action time or T2 action time during T period.

Namely, when the action time is T1 during T period, the depth of color is in high concentration according to the driving current of the emitting element is increased, when the action time is T2 being shorter than T1, the depth of color is in low concentration according to the driving current of the emitting is decreased.

For example, the emitting means 302 represents a color tone of purple by the red emitting elements and the blue emitting elements. At this time, when the action time of the red emitting elements is longer than the action time of the blue emitting elements, the emitting means 302 represents the color of purple being approached the tone of red.

Also, when the action time of the blue emitting elements is longer than the action time of the red emitting elements, the emitting means 302 represents the color of purple being approached the tone of blue.

Generally, a pixel light lamp used in an electric bulletin board is occurred a phenomenon of persistence because the pixel is controlled by time division at a scan speed of 60 Hz such as a TV and is controlled by pulse-width modulating.

On the other hand, the light emitting lamp of the present invention can be prevented the phenomenon of persistence, flicker and dazzling because the light emitting lamp of the present invention executes pulse-width modulation having a plurality of grades.

When the light emitting lamp of the present invention is inputted the control signal of brightness or color from the RF signal receiver 108 or the switch unit 306, the light emitting lamp of the present invention controls the brightness and color of the emitting means 302 in accordance with the control signal of brightness or color stored in the memory 318.

For example, user sets the brightness and color for a mood illumination by the plurality of keys of a remote controller or the switch unit 306 and then demands for storing a key value set using the memory key of the remote controller or the memory key of the switch unit 306. The controller stores the key value set in the memory 318

Since then, when user demands the mood illumination using the memory key of the remote controller or the switch unit 306, the controller controls the brightness and the color of the emitting means 302 in accordance with the key value stored in the memory 318.

At this time, a description of the process for controlling the brightness and color by key value stored in the memory 318 may be omitted because it is essentially the same as described above.

Industrial Applicability

According to the present inventions the controlling the brightness and the color of the light emitting lamp by amplitude modulation and pulse-width modulation though the plurality of phases. So, the advantage of the present invention is that the light emitting lamp can control the brightness and the color easily.

Also, the advantage of the present invention is that the user of the light emitting lamp can manipulate easily by the memory key of the switch unit which stores the key value of the brightness and the color which set by the user.

This application is therefore intended to cover any variations, uses or adaptations of the invention using its general principles. Further, this application is intended to cover such departures from the present disclosure as come within known or customary practice in the art to which this invention pertains.

What is claimed is:

1. A light emitting lamp having a plurality of emitting elements, including red color emitting elements, green color emitting elements and blue color emitting elements, comprising:

an input means for inputting a control request signal of brightness and color by a user;

a brightness control means for generating an amplitude modulated digital regulation signal having a plurality of signal levels according to the control request signal of brightness; and a color control means for generating a pulse-width modulated digital regulation signal having a plurality of signal levels according to the control request signal of color;

wherein, the brightness of the plurality of emitting elements are controlled by the amplitude modulated digital regulation signal and the color of the plurality of the emitting elements is controlled by the pulse-width modulated digital regulation signal.

2. The light emitting lamp of claim 1, wherein the brightness control means further comprises;

an AC/DC converter for converting an AC power source to a DC power source;

a controller for generating a control signal of brightness in accordance with the control request signal of brightness after receiving the DC power source from the AC/DC converter;

a D/A converter for generating a current having a plurality of signal levels by subdividing a reference voltage in accordance with the control signal of brightness;

an amplitude modulation generator for generating the digital regulation signal of the brightness having a plurality of signal levels by modulating the current's amplitude;

an electric power amplifier for amplifying the digital regulation of the brightness generated from the amplitude modulation generator and then for generating the digital regulation signal of brightness amplified for the plurality of emitting elements, wherein the D/A converter generates the current having $2^n$ signal levels according to structured bits of the D/A converter.

3. The light emitting lamp of claim 2, wherein the D/A converter is unitized with the controller.

4. The light emitting lamp of claim 1, wherein the color control means further comprises;

an AC/DC converter for converting an AC power source to a DC power source;

a controller for generating a control signal of color in accordance with the digital control request signal of color after receiving the DC power source from the AC/DC converter;

a D/A converter for generating a current having a plurality of signal levels by subdividing a reference voltage in accordance with the control signal of color;

a pulse-width modulation generator for generating the digital regulation signal of color having a plurality of signal levels by modulating the current's pulse-width;

an electric power amplifier for amplifying the digital regulation signal of color generated from the pulse-width modulation generator and then for generating the digital regulation signal of color amplified for the plurality of emitting elements, wherein the controller controls the red emitting elements, the green emitting elements and the blue emitting elements individually, the D/A converter generates the current having $2^n$ signal levels according to structured bits of the D/A converter.

5. The light emitting lamp of claim 4, wherein the D/A converter is unitized with the controller.

6. The light emitting lamp of claim 1, wherein the input means comprises at least one selected from the group consisting of a RF signal receiver for receiving the control request signal formed radio frequency signal and a switch unit for inputting the control request signal in accordance with a certain key signal.

7. The light emitting lamp of claim 6, wherein the RF signal receiver is installed on a central region formed the plurality of emitting elements or an outer region formed the plurality of emitting elements.

8. The light emitting lamp of claim 6, wherein the switch unit comprises at least an increment key and a reduction key of brightness, an increment key and a reduction key of color and a plurality of memory keys.

9. The light emitting lamp of claim 1, wherein the emitting element is an LED(Light Emitting Diode).

10. The light emitting lamp of claim 1, further comprising;

a memory for generating the control request signal of brightness and color stored to the brightness control means and the color control means.

11. A light emitting lamp having an electrode, a spiral electrode and a substrate formative implement, comprising;

a brightness control means and a color control means for controlling the brightness and the color of the light emitting lamp installed inside of the substrate formative implement;

an emitting means having a plurality of emitting elements controlled by the brightness control means and the color means through a plurality of levels;

An RF receiving means installed on a inside region formed the plurality of emitting elements or an outer region formed the plurality of emitting elements;

a glove cap coupled to the substrate formative implement removably which encloses the emitting means and the RF receiving means.

12. The light emitting lamp of claim 11, wherein the emitting means consists of a plurality of red color LEDs, a plurality of green color LEDs and a plurality of blue LEDs.

* * * * *